(12) United States Patent
Ni

(10) Patent No.: US 6,677,283 B2
(45) Date of Patent: Jan. 13, 2004

(54) BEARING ASSEMBLY AND METHOD AND LUBRICATION GREASE

(75) Inventor: Ben Ni, Naperville, IL (US)

(73) Assignee: Emerson Power Transmission Manufacturing, L.P., Maysville, KY (US)

(*) Notice: Subject to any disclaimer, the term of this patent is extended or adjusted under 35 U.S.C. 154(b) by 36 days.

(21) Appl. No.: 09/948,975

(22) Filed: Sep. 7, 2001

(65) Prior Publication Data

US 2002/0022581 A1 Feb. 21, 2002

Related U.S. Application Data

(62) Division of application No. 09/412,154, filed on Oct. 5, 1999, now Pat. No. 6,474,870.

(51) Int. Cl.[7] .......................................... C10M 117/00
(52) U.S. Cl. ......................................................... 508/459
(58) Field of Search ........................................ 508/459

(56) References Cited

U.S. PATENT DOCUMENTS

| | | | | |
|---|---|---|---|---|
| 2,005,553 A | * | 6/1935 | Miller et al. ................ | 508/459 |
| 3,000,820 A | * | 9/1961 | Eisenhauer et al. ......... | 508/437 |
| 3,163,604 A | * | 12/1964 | Dubin ......................... | 508/459 |
| 3,932,006 A | | 1/1976 | Tertinek et al. | |
| 4,274,973 A | * | 6/1981 | Stanton et al. ............... | 508/459 |
| 4,312,769 A | * | 1/1982 | Pratt .......................... | 508/505 |
| 4,726,696 A | | 2/1988 | Dickinson et al. | |
| 5,028,151 A | | 7/1991 | Nisley | |
| 5,401,105 A | | 3/1995 | Suzuki et al. | |
| 5,704,719 A | | 1/1998 | Cook et al. | |
| 5,716,147 A | | 2/1998 | Cook et al. | |
| 5,863,137 A | | 1/1999 | Johnson et al. | |
| 5,927,864 A | | 7/1999 | Feerick | |

OTHER PUBLICATIONS

Dorinson, The Slow–Speed Frictional Behavior of Some Lubricant AdditiveType–Substances, Oct. 14, 1969, pp. 215–221.
National Lubricating Grease Institute, Lubricating Grease Guide, 4th Ed. 1996.
Rizvl, Lubricant Additives and Their Functions, pp 1–6.

* cited by examiner

Primary Examiner—Jacqueline V. Howard
(74) Attorney, Agent, or Firm—McDonnell Boehnen Hulbert & Berghoff

(57) ABSTRACT

Disclosed is a bearing assembly that includes a bearing insert that engages a bearing housing at an interface. In accordance with the invention, the interface is lubricated with a lubricant that provides sufficient lubrication such that the breaking housing torque required to initiate relative movement of the outer portion and housing is no greater than 130% of the moving housing torque required to maintain relative movement of the outer portion and housing. The lubricant preferably is a fatty acid, such as stearic acid or palmitic acid. In accordance with highly preferred embodiments of the invention, the lubricant comprises a grease composed of a base lubricating oil that is thickened with a fatty acid that is substantially uniformly dispersed therein.

3 Claims, 2 Drawing Sheets

BEARING ASSEMBLY AND METHOD AND LUBRICATION GREASE

This is a divisional of application Ser. No. 09/412,154—Filed: Oct. 5, 1999, now U.S. Pat. No. 6,474,870.

TECHNICAL FIELD OF THE INVENTION

The invention relates to bearing assemblies and, more specifically, to bearing assemblies having a lubricant disposed at the interface between the bearing insert and the bearing housing. The invention is also directed towards a lubricating grease that is particularly suitable for use in connection with such lubrication of bearing assemblies.

BACKGROUND OF THE INVENTION

Various rolling element and sleeve bearings are known in the art. Rolling element bearings generally comprise a plurality of rolling elements, such as balls, disposed between inner and outer races of a bearing insert. In mounted rolling element bearings, the inner and outer races are disposed within a bearing housing, typically a pillow block housing. Sleeve bearings are similarly constructed, but in such bearings, the bearing insert comprises an inner sleeve and an outer sleeve that is disposed in a relatively rotating relationship with respect to the inner sleeve. Most mounted bearings in use today are of the self-centering variety, wherein the outer race or sleeve is not affixed to the housing, but rather is supported by the housing in a manner that permits limited pivotal rocking movement between the outer race or sleeve and the housing. Exemplary bearing assemblies are disclosed, for example, in U.S. Pat. No. 5,716,147 (Cook et al.), U.S. Pat. No. 5,863,137 (Johnson et al.), U.S. Pat. No. 5,704,719 (Cook et al.), and U.S. Pat. No. 5,927,864 (Feerick).

In such self-centering bearing assemblies, the housing and the bearing insert meet at an interface, which is typically defined by engaging curved profile portions of the insert and housing that allow relative pivotal rocking movement of the housing and bearing insert. One well known problem with such inserts is that the movement of the bearing insert with respect to the housing is difficult to initiate, but, once initiated, this movement proceeds undesirably rapidly, thus causing the overall movement of the bearing insert to be somewhat jerky. This problem, known in the art as the "stick-slip" problem, is of importance both in connection with the installation of the bearing onto a machine, and in connection with the calibration of the bearing assembly during manufacture. The stick-slip problem is of particular significance in connection with the calibration of bearing assemblies. If the housing fit about the insert is too loose, the bearing may experience excessive fretting wear during its service, especially when vibratory load is encountered. On the other hand, if the housing fit is too tight, large housing torques, or resistant moments resulting from the friction between the bearing insert and the housing, are required to effectuate self-alignment. Bearing assemblies are calibrated using a tool such as a torque wrench which measures the breaking housing torque, or torque required to initiate relative movement of the bearing insert and housing, and moving housing torque, or torque required to maintain relative movement of the insert and housing. The stick-slip problem can make these torque measurements difficult to obtain.

THE INVENTION

In overcoming these problems, there is now provided a bearing assembly that includes a lubricant disposed at the interface between the bearing insert and housing, which lubricant comprises a lubricating material that provides sufficient lubrication between the housing and insert such that the breaking housing torque is no greater than 130% of the moving housing torque, and preferably is less than the moving housing torque. It has been found that fatty acids are particularly suitable as lubricating materials to provide such relationship between the breaking and moving housing torques. In a highly preferred embodiment of the invention, the fatty acid is provided in the form of a grease which comprises a base lubricating oil and a fatty acid thickener that is substantially uniformly dispersed therein.

These and other features and advantages of the invention will be more readily apparent upon reading the follow description of preferred exemplified embodiments of the invention and upon reference to the accompanying drawings, wherein:

Figure 1:
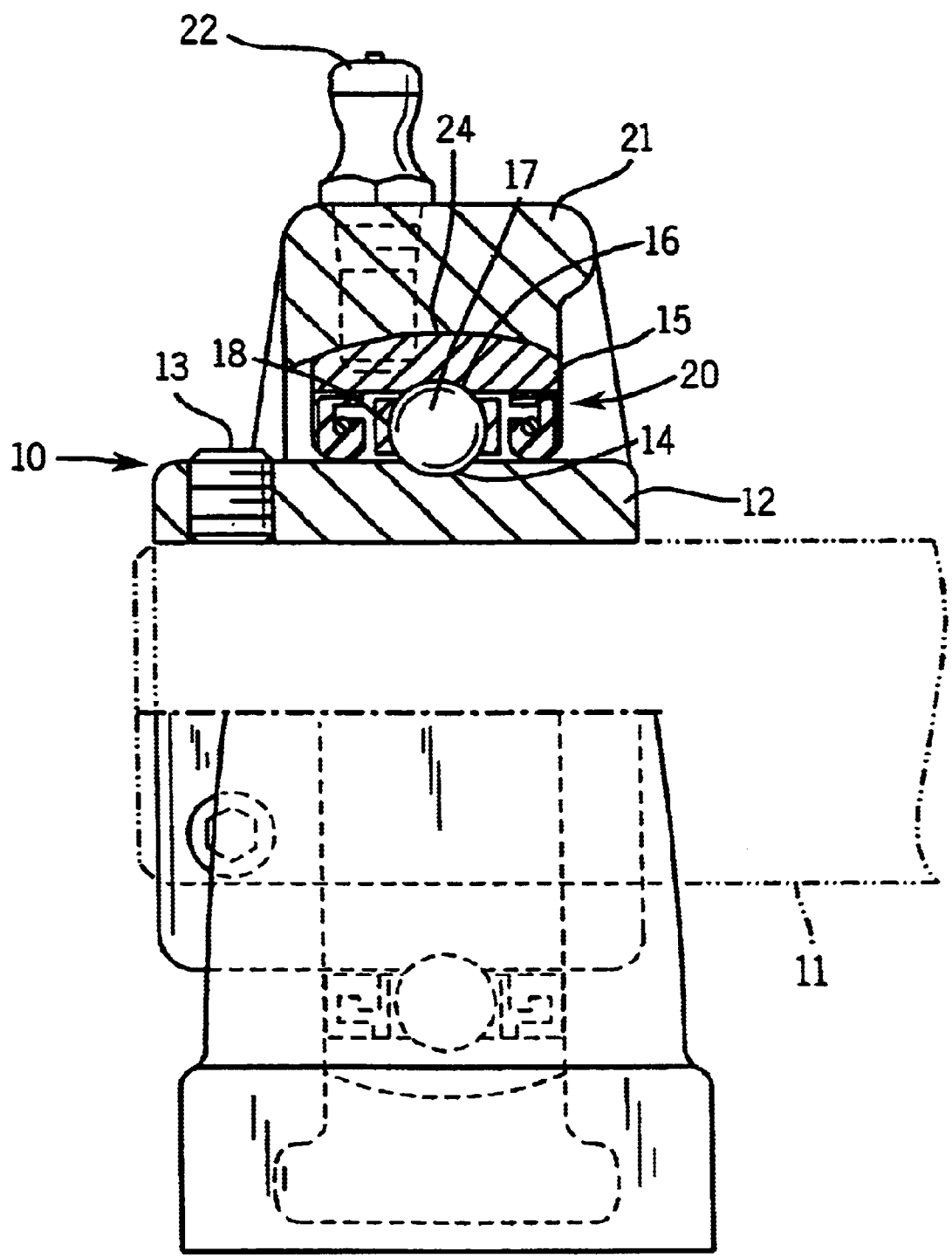
FIG. 1 is a side elevational view in partial cross section of an exemplary bearing assembly in accordance with the invention.

While the invention is susceptible of various modifications and alternative constructions, certain illustrated embodiments thereof have been shown in the drawings and will be described below in detail. It should be understood, however, that there is no intention to limit the invention to the specific forms disclosed. But on the contrary, the intention is to cover all modifications, alternative constructions and equivalents falling within the spirit and scope of the invention.

DESCRIPTION OF PREFERRED EMBODIMENTS

Referring now more particularly to FIG. 1 of the drawings, there is shown an illustrative bearing assembly 10 mounted on a shaft 11 (shown in phantom). The bearing assembly 10 includes an inner race 12 having a grooved raceway 14 formed in a body portion thereof. The assembly further includes an outer race 15 having a grooved raceway 16 disposed in opposed relationship with respect to the inner raceway 14. The raceways 14, 16 serve to receive in nesting relationship a plurality of spaced rolling elements 17 which, in the illustrated embodiment, are balls. The inner race 12 is secured to the shaft by a locking mechanism, which, in the illustrated embodiment, is a set screw 13. The balls are disposed in rolling element pockets of a conventional cage 18. Taken together, the rolling elements and inner and outer races comprise a bearing insert 20, which bearing insert is disposed within a pillow block housing 21. The pillow block housing 21 includes a conventional grease fitting 22 for lubrication of the rolling elements. The housing 21 engages the outer race 15 at an interface 24 which is defined by curved portions of the housing and outer race.

Figure 2:
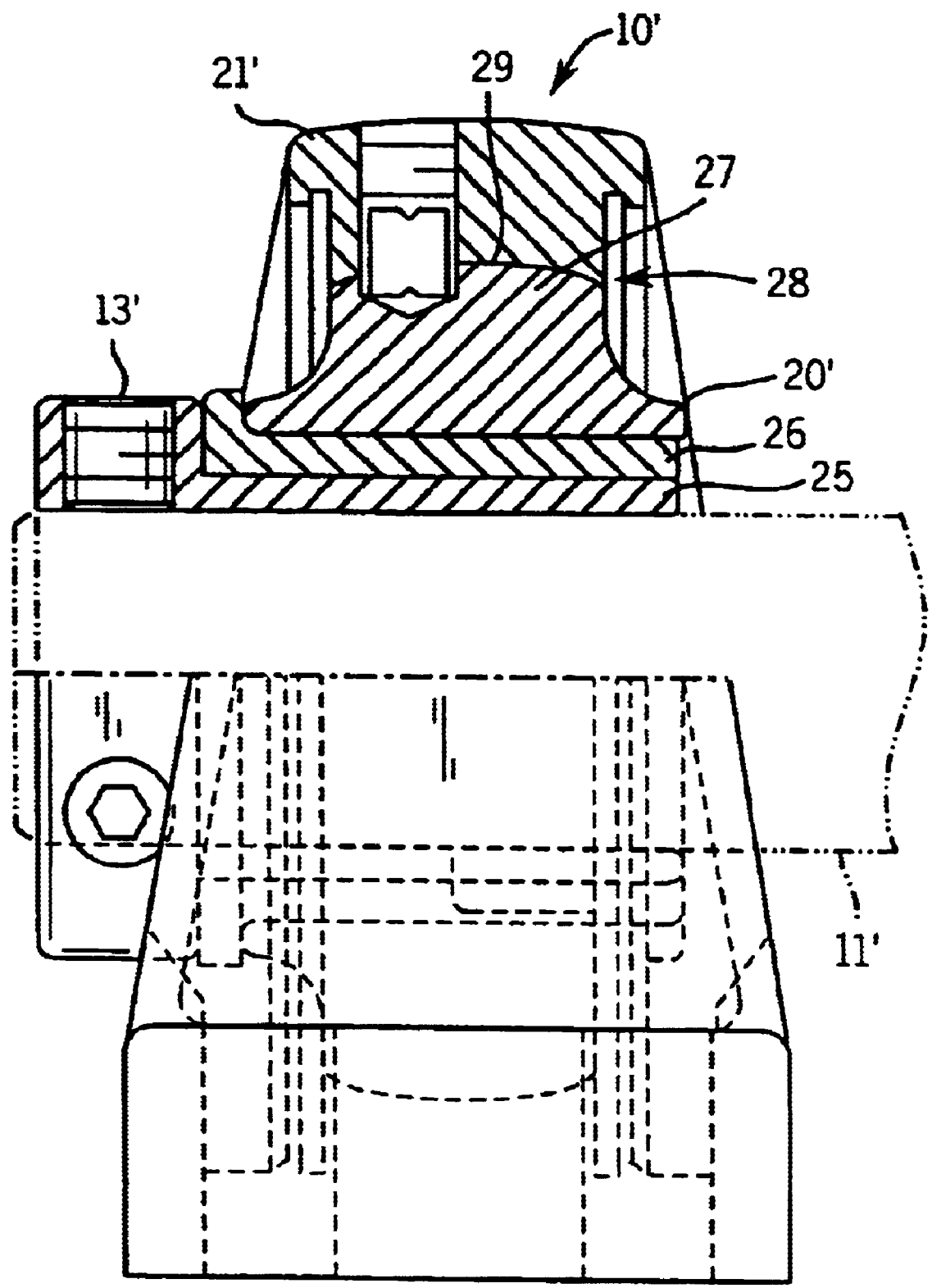
FIG. 2 is a side elevational view in partial cross section of an alternative embodiment of the bearing assembly of the invention.

Another embodiment of the invention is shown in FIG. 2. In this embodiment, the bearing assembly 10' includes a sleeve-type bearing insert 20 which comprises an inner sleeve 25 secured to the shaft 11' by a set screw 13', and an outer sleeve 26 which is supported by a support member 27 to form an outer sleeve member 28. The assembly 10' further includes a housing 21' which engages the outer sleeve member 28 at an interface 29 which is defined by curved portions of the housing and outer sleeve member. The bearing assembly may include other seals, fittings, or the like (not shown).

In accordance with the invention, a lubricant for controlling the relative relationship between breaking housing torque and moving housing torque is disposed at the interface (e.g., interface 24 in FIG. 1 and interface 29 in FIG. 2) between the housing and the bearing insert. The lubricant comprises a lubricating material that provides sufficient lubrication such that the breaking housing torque is no greater than 130% of the moving housing torque. Housing torques refer to the moments of force required to initiate or maintain relative movement of the bearing insert and housing, and are determined with respect to the center of the bearing assembly. The housing torques are determined at 25° C. and, with respect to the moving housing torque, at constant speeds of relative movement between the housing and insert at least up to about 10 cm/second. While it is believed that the stick-stop problem will be substantially reduced or eliminated when the breaking and moving housing torques are of such relative magnitude, the breaking housing torque preferably is less than 130% of the moving housing torque, and preferably is no greater than 110% of the moving housing torque. For example, the breaking housing torque may be 105% of the moving housing torque, 100% of the moving housing torque, or less than 100% of the moving housing torque.

In carrying out the invention, a number of lubricants may be employed. It has been found that a fatty acid in free acid form, i.e., as opposed to ester or acid salt form, may be employed as a lubricant to provide the foregoing torque relationship in a typical bearing in which the housing and insert are constructed of steel, aluminum, or other metal or suitable material. "Fatty acid" refers to an animal- or vegetable-originated or derived fatty acid, preferably having a carbon backbone of about 13–22 carbon atoms. More generally, it is contemplated that any semi-solid or solid saturated or unsaturated fatty acid may be used in conjunction with the invention. Suitable fatty acids include stearic acid, palmitic acid and mixtures thereof. One particularly suitable acid is a 50/50 weight percent mixture of stearic and palmitic acids. This and other acids may be obtained in a food grade form if required or desired for a given application.

In accordance with a highly preferred embodiment of the invention, the fatty acid is provided in the form of an oily grease which comprises a base lubricating oil, typically an animal oil, vegetable oil, mineral oil, or synthetic oil, which has the fatty acid substantially uniformly dispersed or suspended therein as a thickener. Suitable base lubricating oils include, for example, mineral oils such as aliphatic petroleum oils, aromatic or asphalt-based petroleum oils, mixed-base petroleum oils, petroleum-derived oils; liquid vegetable oils, such as linseed, tung, oiticica, soybean, cottonseed, caster, coconut, and the like; synthetic oils; and liquid animal oils such as fish oils, fish-liver oils, and so forth. The fatty acid may be present in any amount effective to thicken the oil to form a grease. Preferably, the fatty acid is present in an amount of at least about 10%, more preferably, about 20 to about 30%, by total weight of the grease. The grease may be provided with other additives, such as corrosion inhibitors or oxidation inhibitors, each of which may be conventional and used in amounts effective respectively to inhibit corrosion and oxidation, or may be provided with other ingredients as may be conventional or otherwise found suitable.

Many conventional greases employ thickeners, such as metal soaps, to provide physical support for the oil. In such cases, the lubricating function is provided by the oil, and the thickener serves only to provide support for the oil. In contrast, while it is not intended to limit the present invention to a particular theory of operation, in the greases of the invention lubrication is believed to be provided both by the oil and by the fatty acid thickener. It is believed that the greases of the invention provide not only sufficient lubrication to effect substantial elimination of the stick-slip problem, but also provide for housing torques that are of overall lower magnitude than can be obtained using conventional greases.

The invention further contemplates a method for lubricating the interface between the bearing insert and housing, the method comprising lubricating with a fatty acid lubricant as discussed hereinabove. Through such lubrication, control of housing torques and ease of assembly and calibration may be achieved.

The following Example is provided to illustrate the present invention, but should not be construed as limiting in scope.

EXAMPLE

Evaluation of Lubricating Grease in a Bearing Assembly

Preparation of Lubricants

A lubricant comprising a 50/50 mixture of stearic acid and palmitic acid was blended with MOBIL DTE extra heavy oil, an ISO 150 grade turbine oil stock that includes oxidation and corrosion inhibitors. The mixture of oil and acid powder was heated to 85° C. to melt the acid and subsequently was cooled. When the mixture cooled and the stearic acid was solidified, the mixture was stirred frequently to form a grease with the consistency of a smooth buttery paste. The composition of the grease was 25% by weight acid/75% by weight DTE oil.

For comparison, a 43% PTFE powder/57% DTE oil grease was prepared by mixing the PTFE powder and oil to form a smooth paste. Another grease composed of a mineral oil (737 SUS at 100° F.) with a lithium 12-hydroxystearate soap and 1% molybdenum disulfide dispersed therein was evaluated.

Preparation of Bearing Assemblies

Two standard bearing inserts and ten pillow block housings were prepared. The insert OD surface roughness Ra and housing inner surface roughness Ra were measured and were found respectively to be about 8.5 μin and 180 μin. The inserts were installed into various housings for evaluation of the lubricants. To ensure consistency of measurement, two housing torques were measured, and each was found to be 400 inch-pounds when the housings were being machined.

Test Procedures

The housing bore and the insert outside diameter surface were cleaned with alcohol and towels. A thin layer of the lubricant was applied to the housing bore, the insert was installed into the housing, and the breaking and moving housing torques were measured with a torque wrench. The following results were obtained:

Example

| Breaking Housing Torque (in.-lb.) | Moving Housing Torque (in.-lb.) |
|---|---|
| 150 | 275 |
| 275 | 275 |

Comparative Example

| Lubricant | Breaking Housing Torque (in.-lb.) | Moving Housing Torque (in.-lb.) |
|---|---|---|
| Lithium grease | 375 | * |
| Lithium grease | 325 | * |
| PTFE grease | 700 | * |

*Unable to measure due to jerky motion ot the bearing insert.

Discussion

As is evident, the PTFE and lithium greases did not improve the housing torque control. The breaking torque values were higher than the moving housing torque values with the lithium and PTFE greases, as was evidenced by the stick-slip behavior. In contrast, not only was the breaking housing torque of overall lower magnitude when using the grease of the invention, the breaking housing torque was less than or equal to the moving housing torque, thus overcoming the stick-slip problem. The absence of stick-slip behavior was confirmed by manual manipulation and inspection.

The grease of the invention may be used in a number of applications other than in connection with the lubrication of the interface between the bearing insert and housing in a bearing assembly. Moreover, the bearing assembly of the invention is not limited to the embodiment shown in the Figures, and indeed may be embodied by other configurations. For example, the bearing assembly may be constructed with such components as flange or cartridge housings, or rolling elements other than balls, or in other configurations.

In summary, it is seen that the present invention provides a bearing assembly that is lubricated in such manner as to overcome the stick-slip problem. The invention further provides a lubricating grease that is satisfactory for this purpose.

All of the prior patents cited herein are hereby incorporated by reference in their entireties.

What is claimed is:

1. A grease comprising a base lubricating oil and a thickener substantially uniformly dispersed therein, said thickener comprising fatty acid in an amount of at least about 10% by weight of said grease, said thickener being substantially free of ester and acid salt.

2. A grease according to claim 1, said fatty acid being present in an amount ranging from about 20% to about 30% by weight of said grease.

3. A grease according to claim 1, said fatty acid being selected from the group consisting of stearic acid, palmitic acid, and mixtures thereof.

* * * * *